US009410460B2

(12) United States Patent
Hackländer

(10) Patent No.: US 9,410,460 B2
(45) Date of Patent: Aug. 9, 2016

(54) EXHAUST SYSTEM OF AN INTERNAL COMBUSTION ENGINE

(71) Applicant: Eberspächer Exhaust Technology GmbH & Co. KG, Neunkirchen (DE)

(72) Inventor: Felix Hackländer, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 14/299,368

(22) Filed: Jun. 9, 2014

(65) Prior Publication Data

US 2014/0360170 A1    Dec. 11, 2014

(30) Foreign Application Priority Data

Jun. 10, 2013  (DE) .......................... 10 2013 210 799

(51) Int. Cl.
*F01N 3/00* (2006.01)
*F01N 3/20* (2006.01)
(Continued)

(52) U.S. Cl.
CPC .............. *F01N 3/2066* (2013.01); *F01N 3/035* (2013.01); *F01N 3/24* (2013.01); *F01N 3/28* (2013.01);
(Continued)

(58) Field of Classification Search
CPC ......... F02D 41/029; F02D 9/04; F01N 9/002; F01N 3/0842; F01N 3/035; F01N 13/02; F01N 13/10; F01N 2240/20; F01N 1/166
USPC ............................. 60/295, 297, 301, 311, 324
See application file for complete search history.

(56) References Cited

U.S. PATENT DOCUMENTS 8,938,945 B2 *   1/2015  Hylands et al. ................. 60/273
2002/0187093 A1 *  12/2002  Muller et al. .................. 423/235
(Continued)

FOREIGN PATENT DOCUMENTS

DE    20 2006 011281 U1     9/2006
DE    202006011281 U1 *    9/2006   ............. F01N 3/035
(Continued)

OTHER PUBLICATIONS

Machine Translation of WO 2012050509, Translated on Mar. 16, 2015.*

(Continued)

*Primary Examiner* — Patrick Maines
(74) *Attorney, Agent, or Firm* — McGlew and Tuttle, P.C.

(57) ABSTRACT

An exhaust system (1) of an internal combustion engine includes an oxidation catalytic converter (2), a particle filter (3), an injector (4) for injecting a reducing agent, a static mixer-evaporator (5), an SCR catalytic converter (6) and a housing (8). The oxidation catalytic converter is upstream of the particle filter and upstream of the SCR catalytic converter. The injector is upstream of the mixer-evaporator and the mixer-evaporator is upstream of the SCR catalytic converter. The housing has a centrally inner channel (9), a ring channel (10) concentrically around the inner channel, an eccentrically outer channel (11), a first deflecting chamber (12) connecting the outer channel with the ring channel and a second deflecting chamber (13) connecting the inner channel with the ring channel. The mixer-evaporator is in the inner channel and the oxidation catalytic converter or particle filter or SCR catalytic converter is ring-shaped and in the ring channel.

12 Claims, 2 Drawing Sheets

(51) Int. Cl.
*F01N 3/28* (2006.01)
*F01N 13/18* (2010.01)
*F01N 3/035* (2006.01)
*F01N 13/00* (2010.01)
*F01N 3/24* (2006.01)

(52) U.S. Cl.
CPC ............ *F01N 3/2882* (2013.01); *F01N 3/2892* (2013.01); *F01N 13/0097* (2014.06); *F01N 13/18* (2013.01); *F01N 2240/20* (2013.01); *F01N 2470/08* (2013.01); *F01N 2610/02* (2013.01); *F01N 2610/1453* (2013.01); *Y02T 10/24* (2013.01)

(56) References Cited

U.S. PATENT DOCUMENTS

| | | | | |
|---|---|---|---|---|
| 2003/0108457 A1* | 6/2003 | Gault | ............... | F01N 3/0211 422/177 |
| 2006/0153748 A1* | 7/2006 | Huthwohl et al. | ............ | 422/172 |
| 2010/0212301 A1* | 8/2010 | De Rudder et al. | ............. | 60/299 |
| 2011/0138782 A1* | 6/2011 | Stieglbauer | ............ | F01N 3/021 60/274 |
| 2011/0219755 A1* | 9/2011 | Muller-Haas | ........... | F01N 3/035 60/287 |
| 2013/0098002 A1* | 4/2013 | Danckert et al. | ................ | 60/282 |
| 2013/0152557 A1* | 6/2013 | Brugger | ......................... | 60/295 |
| 2014/0026540 A1* | 1/2014 | Beyer et al. | .................... | 60/273 |

FOREIGN PATENT DOCUMENTS

| | | | | |
|---|---|---|---|---|
| DE | 102007062662 A1 | * | 6/2009 | ............. F01N 1/084 |
| DE | WO 2012050509 | * | 4/2012 | |
| EP | 1 801 372 A1 | | 6/2007 | |
| GB | WO 0104466 A1 | * | 1/2001 | ........... F01N 3/0231 |
| GB | 2 454 276 A | | 5/2009 | |
| WO | 97/01 387 A1 | | 1/1997 | |
| WO | 01/04466 A1 | | 1/2001 | |

OTHER PUBLICATIONS

Machine Translation of DE 202006011281, Translated on Sep. 16, 2015.*

* cited by examiner

EXHAUST SYSTEM OF AN INTERNAL COMBUSTION ENGINE

CROSS REFERENCE TO RELATED APPLICATIONS

This application claims the benefit of priority under 35 U.S.C. §119 of German Patent Application DE 10 2013 210 799.4 filed Jun. 10, 2013, the entire contents of which are incorporated herein by reference.

FIELD OF THE INVENTION

The present invention pertains to an exhaust system for an internal combustion engine.

BACKGROUND OF THE INVENTION

Modern exhaust systems for internal combustion engines carry out relatively complex exhaust gas treatments, wherein different exhaust gas treatment means are used. For example, an oxidation catalytic converter is used to react unburnt hydrocarbons with residual oxygen. Carbon monoxide can also be reacted into carbon dioxide. Further, a particle filter may be provided, especially in case of a diesel engine, to filter out particles carried in the exhaust gas, especially soot. Furthermore, an SCR system, where SCR means Selective Catalytic Reduction, may be provided, preferably in case of a diesel engine. Such an SCR system usually comprises an injector for injecting a reducing agent as well as an SCR catalytic converter. Ammonia or an aqueous urea solution is usually used as the reducing agent. Ammonia can be generated from aqueous urea by means of thermolysis and hydrolysis, and this ammonia can be used in the SCR catalytic converter to reduce nitrogen oxides to nitrogen and carbon dioxide. In order for the reducing agent, which is usually injected in the liquid form into the exhaust gas flow, to be able to evaporate by the time it reaches the SCR catalytic converter and mix with the exhaust gas, a certain mixing section is necessary. To improve the evaporation and/or mixing and to shorten such a mixing section, a static mixer-evaporator may be used, which is to be arranged between the injector and the SCR catalytic converter. Such a mixer-evaporator differs from a conventional static mixer in that the guide surfaces or guide blades of the mixer-evaporator are used at the same time to evaporate liquid reducing agent impinging on them. In particular, such a mixer-evaporator can be made extensively opaque in the direction in which the flow moves through it, so that droplets being carried in the flow can reach the guide blades and evaporated thereon. Such a mixer-evaporator is consequently always to be arranged downstream of an injection, which is provided for injecting the liquid reducing agent, in an SCR system, which operates with a liquid reducing agent.

In addition, the fact that only a comparatively small space is available for installation for accommodating the exhaust system arises as a general problem in case of applications in vehicles.

SUMMARY OF THE INVENTION

The present invention pertains to an object of providing an improved embodiment for an exhaust system of the type mentioned in the introduction, which is characterized especially by a compact design.

The present invention is based on the general idea of providing a common housing for accommodating a plurality of components of the exhaust system, which housing comprises a centrally arranged inner channel, a ring channel arranged concentrically around the inner channel and an outer channel arranged eccentrically and outside the ring channel. The housing has, in addition, a first deflecting chamber connecting the outer channel with the ring channel and a second deflecting chamber connecting the inner channel with the ring channel. The aforementioned static mixer-evaporator may be arranged in this case in the inner channel, while the oxidation catalytic converter or particle filter and/or SCR catalytic converter may be arranged in the ring channel, for which purpose the oxidation catalytic converter and particle filter and SCR catalytic converter are ring-shaped. The other components are arranged within the exhaust system such that the oxidation catalytic converter is located upstream of the particle filter and upstream of the SCR catalytic converter. Further, the injector or its injection site is located upstream of the mixer-evaporator, whereas the mixer-evaporator is arranged upstream of the SCR catalytic converter. The design being proposed leads to an extremely compact arrangement of a plurality of components of the exhaust system within the common housing. In addition, an extremely short design is obtained for the exhaust system due to the flow deflections within the common housing, because a comparatively long flow section, in which at least the mixer-evaporator and oxidation catalytic converter or particle filter are arranged, can be embodied due to the deflections within the common housing.

Corresponding to an advantageous embodiment, a housing inlet may be formed on the outer channel, while the injector is arranged in this case coaxially to the inner channel at the second deflecting chamber. The flow is thus directed in the housing from the outside to the inside, so that the exhaust gas consequently enters the first deflecting chamber through the outer channel during the operation of the exhaust system, it reaches the second deflecting chamber via the ring channel from the said first deflecting chamber, and it flows into the inner channel from the said second deflecting chamber.

In another embodiment, the oxidation catalytic converter may be arranged in the ring channel, while the mixer-evaporator is arranged upstream of the particle filter and the injector injects the reducing agent into the second deflecting chamber. Injection of the reducing agent into the second deflecting chamber is advantageous here because intensive flow deflection takes place in the deflecting chamber anyway, which supports thorough mixing between the reducing agent and the exhaust gas. Further, it is possible as a result to arrange the mixer-evaporator at the inlet of the inner channel, so that more space is available in the inner channel downstream of the mixer-evaporator. This space can be used as a mixing section. This space can likewise be used to accommodate the SCR catalytic converter or the particle filter. Integration of the SCR catalytic converter function in the particle filter by providing a substrate of the particle filter with a corresponding SCR catalytic converter coating is also conceivable.

According to a variant, the particle filter can be correspondingly arranged downstream of the mixer-evaporator in the inner channel. As an alternative, the SCR catalytic converter may be arranged downstream of the mixer-evaporator in the inner channel. As was mentioned, a particle filter with SCR catalytic converter coating may also be arranged downstream of the mixer-evaporator in the inner channel.

Furthermore, the particle filter may be arranged downstream of the inner channel outside the housing in a separate particle filter housing. Analogously hereto, the SCR catalytic converter may be arranged downstream of the inner channel outside the housing in a separate SCR catalytic converter housing. An embodiment in which a particle filter, which is provided with an SCR catalytic converter coating, is arranged downstream of the inner channel outside the housing in a separate housing, is likewise possible here as well.

A housing inlet may be formed in an alternative embodiment at the inner channel, while the injector is arranged at the inner channel in this case. The flow is directed from the inside to the outside through the entire housing in this embodiment, so that the exhaust gas consequently enters the inner channel via the housing inlet during the operation of the exhaust system, it reaches the second deflecting chamber from the inner channel, and is led through the ring channel into the first deflecting chamber, so that the exhaust gas can be finally removed via the outer channel. This embodiment is comparatively compact as well.

In addition or as an alternative, provisions may be made for the particle filter and/or SCR catalytic converter to be arranged in the ring channel, while the mixer-evaporator is arranged upstream of the particle filter or of the SCR catalytic converter and the injector injects the reducing agent into the inner channel. It is again conceivable in this case as well that either the particle filter or SCR catalytic converter or a particle filter provided with an SCR catalytic converter coating is arranged in the ring channel in order to embody the most compact design possible in this case.

Corresponding to an advantageous variant, the oxidation catalytic converter may be arranged upstream of the inner channel outside the housing in a separate oxidator housing.

The mixer-evaporator may be arranged in terms of flow between the oxidation catalytic converter and particle filter or between the oxidation catalytic converter and SCR catalytic converter in another advantageous embodiment. An embodiment in which a particle filter, which has an SCR catalytic converter coating, is used, is likewise conceivable here as well.

According to another embodiment, the injector can inject the reducing agent, in terms of flow, between the oxidation catalytic converter and the particle filter. Provisions are advantageously made in this case for the SCR catalytic converter to be provided separately from the particle filter and to be arranged downstream of the particle filter within or outside the common housing. The particle filter is thus used in this case to embody a mixing section or to bring about intensive mixing of reducing agent and exhaust gas.

Corresponding to an advantageous embodiment, a flow deflection by up to 180° and preferably by about 180° may take place in the first deflecting chamber. A flow deflection by up to 180° and preferably by about 180° may take place in the second deflecting chamber in another advantageous embodiment. Especially advantageous is an embodiment in which a housing inlet and a housing outlet define parallel flow directions. It is achieved in this case in connection with the double flow deflection by about 180° that the exhaust gas leaves the housing in the same direction in which it enters the housing. A relatively compact design can be obtained for the housing due to the flow deflection(s).

To embody the common housing being presented here, the ring channel may extend radially between an inner pipe and a pot, with the inner pipe protruding coaxially into the pot. The inner channel now extends in the inner pipe, while the outer channel extends in a separate outer pipe, which is arranged on an outside of the pot or outside the pot.

In such an embodiment, the first deflecting chamber may be advantageously arranged according to a variant in a cover of the pot, which connects the pot with the outer pipe. Contrary to this, the second deflecting chamber may be arranged within the pot in the area of the bottom of the pot. This leads to a design of the common housing that can be embodied in a simple manner, which reduces the effort needed to manufacture the exhaust system.

It is apparent that the above-mentioned features, which will also be explained below, can be used not only in the particular combination described, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
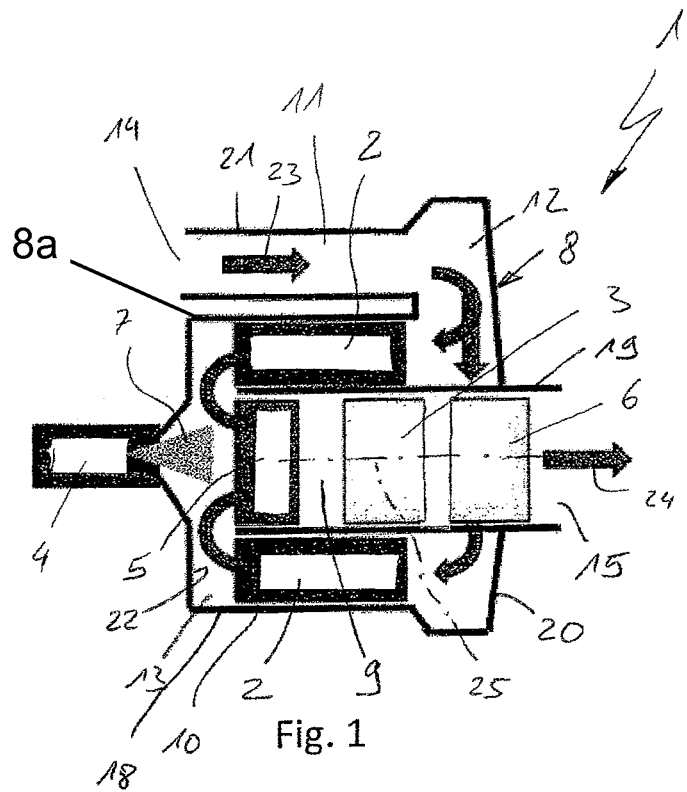
FIG. 1 is a highly simplified longitudinal sectional view through an exhaust system according to one of different embodiments.
Figure 2:
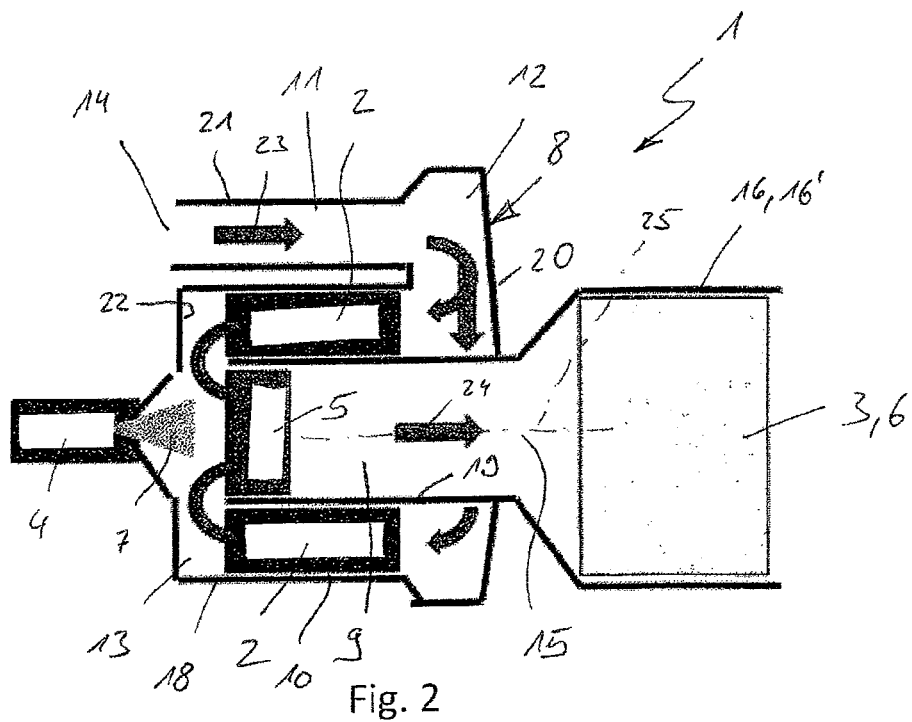
FIG. 2 is a highly simplified longitudinal sectional view through an exhaust system according to another of different embodiments.
Figure 3:
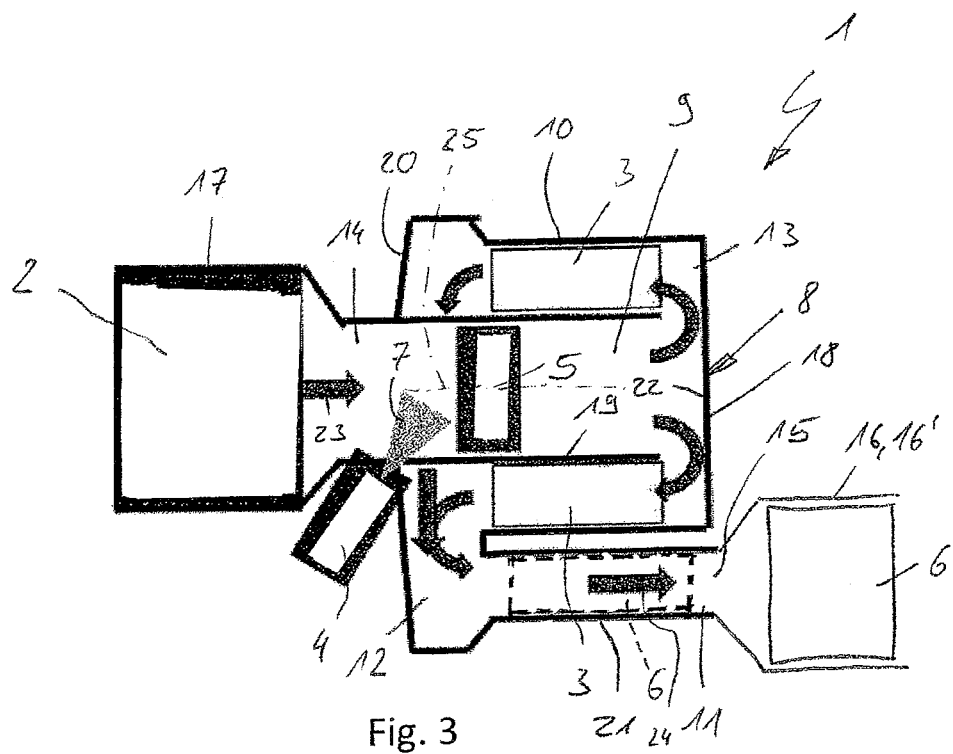
FIG. 3 is a highly simplified longitudinal sectional view through an exhaust system according to another of different embodiments.
Figure 4:
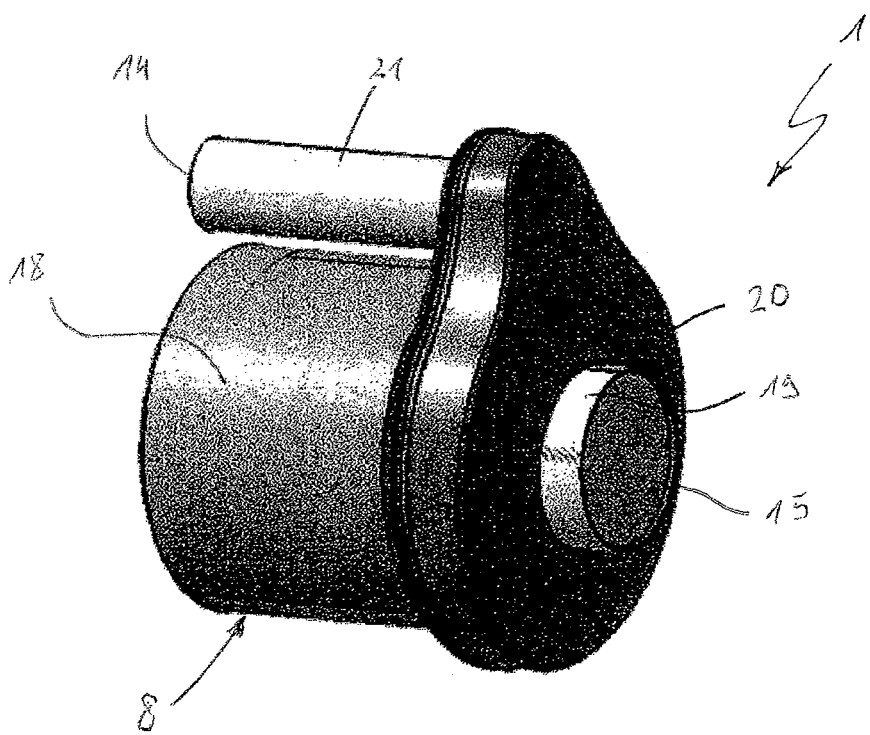
FIG. 4 is an isometric view of the exhaust system.

Referring to the drawings in particular, corresponding to FIGS. 1 through 3, an exhaust system 1, which is used to remove exhaust gas generated during the operation of an internal combustion engine, not shown here, and to subject it to exhaust gas treatment, comprises an oxidation catalytic converter 2, a particle filter 3, an injector 4, a static mixer-evaporator 5 and an SCR catalytic converter 6. The injector 4 is used to inject a reducing agent, and an injection jet 7 is suggested in FIGS. 1 through 3.

The exhaust system 1 has, in addition, a housing 8, which can hereinafter also be called common housing 8 or main housing 8. Housing 8 has a centrally arranged inner channel 9, a ring channel 10 arranged concentrically around the inner channel 9 and an outer channel 11 arranged eccentrically in relation to the inner channel 9. A portion 8a of the housing 8 is located between the outer channel 11 and the ring channel 10. Further, the housing 8 has a first deflecting chamber 12, which connects the outer channel 11 with the ring channel 10, as well as a second deflecting chamber 13, which connects the inner channel 9 with the ring channel 10. This housing 8 is intended for receiving a plurality of components of the exhaust system 1. In particular, the mixer-evaporator 5 is arranged in the inner channel 9 in all the embodiments shown here. Further, the oxidation catalytic converter 2 is arranged in the ring channel 10 in the embodiments according to FIGS. 1 and 2, and the oxidation catalytic converter 2 has a ring-shaped design for this. By contrast, the particle filter 3 has a ring-shaped design and is arranged in the ring channel 10 in the embodiment shown in FIG. 3. Furthermore, the components of the exhaust system 1 are positioned in a certain relation to one another. In particular, the oxidation catalytic converter 2 is always arranged upstream of the particle filter 3 and upstream of the SCR catalytic converter 6. By contrast, the injector 4 is arranged upstream of the mixer-evaporator 5 and upstream of the SCR catalytic converter 6. The particle filter 3 and SCR catalytic converter 6 are designed as separate components in the embodiment shown in FIGS. 1 and 3. Contrary to this, FIG. 2 shows as an example an embodiment in which the functionality of the SCR catalytic converter 6 is integrated in the particle filter 3. A substrate of the particle filter 3 may be provided for this with a catalytically active coating, which assumes the function of the catalytic converter.

The arrangement of the particle filter 3 and SCR catalytic converter 6 shown in FIG. 1 may also be reversed, so that the SCR catalytic converter 6 is located upstream of the particle filter 3.

Housing 8 has a housing inlet 14 as well as a housing outlet 15. The housing inlet 14 is formed on the outer channel 11 in the embodiments shown in FIGS. 1 and 2, so that the exhaust gas enters the housing 8 at the outer channel 11 during the operation of the exhaust system 1 or during the operation of the corresponding internal combustion engine. The housing outlet 15 is located now on the inner channel 9. The injector 4 is arranged coaxially to the inner channel 9 at the second deflecting chamber 13 in these embodiments. Further, the oxidation catalytic converter 2 is arranged in the ring channel 10 in this case. The mixer-evaporator 5 is located upstream of the SCR catalytic converter 6 as well as upstream of the particle filter 3. The injector 4 injects the reducing agent into the second deflecting chamber 3. The mixer-evaporator 5 is arranged at the inlet of the inner channel 9, i.e., on a front side of the inner channel 9 facing the second deflecting chamber 13.

Further, provisions are made in the embodiment shown in FIG. 1 for the particle filter 3 to be arranged downstream of the mixer-evaporator 5 in the inner channel 9. Further, the SCR catalytic converter 6 is arranged in this case, in addition, in the inner channel 9, i.e., upstream of the housing outlet 15.

Contrary to this, FIG. 2 shows an embodiment in which the particle filter 3 is arranged downstream of the inner channel 9, i.e., downstream of the housing outlet 15 in a separate particle filter housing 16. As an alternative, the SCR catalytic converter 6 may also be arranged outside the housing 8 in a separate SCR catalytic converter housing 16'. As was stated, the SCR catalytic converter function is integrated in the particle filter 3 in the embodiment shown in FIG. 2. It is likewise conceivable in this case to provide two separate components for the particle filter 3 and the SCR catalytic converter 6 in a common housing 16 or in separate housings 16, 16'.

Further, a combination of the embodiments shown in FIGS. 1 and 2 is conceivable, in which the particle filter 3 is arranged in the inner channel 9 and the SCR catalytic converter 6 in the separate housing 16' arranged downstream. A reversed design is likewise also conceivable, in which the SCR catalytic converter 6 is arranged in the inner channel 9, whereas the particle filter 3 is arranged downstream thereof outside the housing 8 in a separate housing 16.

The housing inlet 14 is formed at the inner channel in the embodiment shown in FIG. 3, while the housing inlet 15 is located at the inlet channel 11. The injector 4 is arranged at the inner channel 9 in this case. To make injection still possible upstream of the mixer-evaporator 5, the mixer-evaporator 5 is arranged at a distance from the inlet end of the inner channel 9. The particle filter 3 is arranged in the ring channel 10 in the example according to FIG. 3. The SCR catalytic converter may be arranged, analogously to FIG. 2, in a separate SCR catalytic converter housing 16' or in the outer channel 11, which is suggested by a broken line in FIG. 3. A reversed arrangement is conceivable, in principle, here as well for the particle filter 3 and the SCR catalytic converter 6, so that the SCR catalytic converter 6 has a ring-shaped design and is arranged in the ring channel 10, while the particle filter 3 is arranged now either in the separate housing 16 following it or in the outlet channel 11. The mixer-evaporator 5 is arranged in both cases upstream of the particle filter 3 and upstream of the SCR catalytic converter 6. Provisions are made for integrating the SCR catalytic converter function in the particle filter 3 here as well in an alternative embodiment.

In addition, provisions are made in the embodiment shown in FIG. 3 for accommodating the oxidation catalytic converter 2 upstream of the inner channel 9 outside the housing 8 in a separate oxidator housing 17, which adjoins the housing inlet 14.

It is remarkable, furthermore, that the mixer-evaporator 5 is arranged between the oxidation catalytic converter 2 and the particle filter 3 in terms of flow in all embodiments. The injection of the reducing agent by means of the injector 4 also takes place between the oxidation catalytic converter 2 and the particle filter 3 in terms of flow.

The outer channel 11 and inner channel 9 are directed in parallel to one another in the example shown. The outer channel 11 and inner channel 9 may be sloped, in principle, quasi at any desired angle in relation to one another in other embodiments. Further, the housing inlet 14 and housing outlet 15 are arranged in the example being shown such that the exhaust gas has parallel directions of flow 23, 24 in them. In particular, these directions of flow 23, 24 are also parallel to a central longitudinal axis 25 of the inner channel 9. The first deflecting chamber 12 brings about a 180° flow deflection between the outer channel 11 and the ring channel 10. The second deflecting chamber 13 likewise brings about a 180° flow deflection from the ring channel 10 to the inner channel 9.

The housing 8 has a pot 18, an inner pipe 19 and a pot cover 20. The inner pipe 19 protrudes coaxially into the pot 18. The ring channel 10 is formed here radially between the inner pipe 19 and the pot 18. The inner channel 9 is enclosed by the inner pipe 19. The outer channel 11 is accommodated, by contrast, in a separate outer pipe 21. The first deflecting chamber 12 is located here in the pot cover 20, which connects the pot 18 with the outer pipe 21. The second deflecting chamber 13 is located within the pot 18 in the area of a pot bottom 22. The injector 4 is arranged at the pot bottom 22 in the embodiments according to FIGS. 1 and 2.

While specific embodiments of the invention have been shown and described in detail to illustrate the application of the principles of the invention, it will be understood that the invention may be embodied otherwise without departing from such principles.

What is claimed is:

1. An exhaust system of an internal combustion engine, the exhaust system comprising:
   an oxidation catalytic converter;
   a particle filter;
   an injector for injecting a reducing agent;
   a static mixer-evaporator;
   a selective catalytic reduction catalytic converter;
   a housing comprising a centrally arranged inner channel, a ring channel arranged concentrically around the inner channel, an eccentrically arranged outer channel, a first deflecting chamber connecting the outer channel with the ring channel, and a second deflecting chamber connecting the inner channel with the ring channel, to form an exhaust gas flow path, said outer channel being parallel to said inner channel, wherein:
the oxidation catalytic converter is arranged upstream of the particle filter and upstream of the SCR catalytic converter, with respect to the exhaust gas flow path;
the injector is arranged upstream of the mixer-evaporator and the mixer-evaporator is arranged upstream of the SCR catalytic converter, with respect to the exhaust gas flow path;
the mixer-evaporator is arranged in the inner channel;
the particle filter and the SCR catalytic converter are arranged in the inner channel, the particle filter and the SCR catalytic converter being downstream of the mixer-evaporator with respect to the exhaust gas flow path; and
the oxidation catalytic converter is of a ring-shaped design and is arranged in the ring channel.

2. An exhaust system in accordance with claim 1, wherein:
a housing inlet is formed at the outer channel;
an outer portion of said housing is located between said outer channel and said ring channel; and
the injector is arranged coaxially to the inner channel at the second deflecting chamber.

3. An exhaust system in accordance with claim 2, wherein:
said outer channel comprises an outer channel inlet and an outer channel outlet, said outer channel inlet and said outer channel outlet being parallel to said inner channel; and
the injector injects the reducing agent into the second deflecting chamber.

4. An exhaust system in accordance with claim 1, wherein the injector injects the reducing agent between the oxidation catalytic converter and the particle filter in terms of flow.

5. An exhaust system in accordance with claim 1, wherein a flow deflection by up to 180° takes place in the first deflecting chamber.

6. An exhaust system in accordance with claim 1, wherein a flow deflection by up to 180° takes place in the second deflecting chamber.

7. An exhaust system in accordance with claim 1, wherein a housing inlet and a housing outlet define parallel directions of flow.

8. An exhaust system in accordance with claim 1, wherein:
the ring channel extends radially between an inner pipe and a pot, into which the inner pipe protrudes;
the inner channel extends in the inner pipe; and
the outer channel extends in an outer pipe, which is arranged outside the pot.

9. An exhaust system in accordance with claim 8, wherein:
the first deflecting chamber is arranged in a pot cover, which connects the pot with the outer pipe; and
the second deflecting chamber is arranged within the pot in the area of a pot bottom.

10. An exhaust system of an internal combustion engine, the exhaust system comprising:
a housing comprising a centrally arranged inner channel, a ring channel arranged concentrically around the inner channel, an eccentrically arranged outer channel, a first deflecting chamber connecting the outer channel with the ring channel, and a second deflecting chamber connecting the inner channel with the ring channel, the housing having a housing inlet and a housing outlet, the channels and deflecting chambers forming an exhaust gas flow path from the upstream housing inlet to the downstream housing outlet;
an injector for injecting a reducing agent;
a static mixer-evaporator arranged in the inner channel;
a selective catalytic reduction (SCR) catalytic converter, the injector being arranged upstream of the mixer-evaporator and the mixer-evaporator being arranged upstream of the SCR catalytic converter;
an oxidation catalytic converter; and
a particle filter, the oxidation catalytic converter being arranged upstream of the particle filter and upstream of the SCR catalytic converter and the oxidation catalytic converter having a ring-shaped design and being arranged in the ring channel, the particle filter and the SCR catalytic converter being arranged downstream of the mixer-evaporator, in the inner channel.

11. An exhaust system in accordance with claim 10, wherein:
the housing inlet is formed at the outer channel;
a portion of said housing is located between said outer channel and said ring channel, said portion of said housing comprising an outer surface of said housing; and
the injector is arranged coaxially to the inner channel at the second deflecting chamber.

12. An exhaust system of an internal combustion engine, the exhaust system comprising:
an oxidation catalytic converter;
a particle filter;
an injector for injecting a reducing agent;
a static mixer-evaporator;
a selective catalytic reduction catalytic converter;
a housing comprising a centrally arranged inner channel, a ring channel arranged concentrically around the inner channel, an eccentrically arranged outer channel, a first deflecting chamber connecting the outer channel with the ring channel, and a second deflecting chamber connecting the inner channel with the ring channel, to form an exhaust gas flow path, wherein:
the oxidation catalytic converter is arranged upstream of the particle filter and upstream of the SCR catalytic converter, with respect to the exhaust gas flow path;
the injector is arranged upstream of the mixer-evaporator and the mixer-evaporator is arranged upstream of the SCR catalytic converter, with respect to the exhaust gas flow path;
the mixer-evaporator is arranged in the inner channel;
the oxidation catalytic converter is of a ring-shaped design and is arranged in the ring channel; and
the particle filter and the SCR catalytic converter are arranged downstream of the mixer-evaporator with respect to the exhaust gas flow path, in the inner channel.

\* \* \* \* \*